United States Patent
Cleron et al.

(10) Patent No.: US 7,671,782 B2
(45) Date of Patent: Mar. 2, 2010

(54) STATE-SENSITIVE NAVIGATION AID

(75) Inventors: Michael A. Cleron, Menlo Park, CA (US); Jeffrey D Yaksick, Sunnyvale, CA (US); Ronald Alan Morris, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/203,313

(22) Filed: Sep. 3, 2008

(65) Prior Publication Data

US 2008/0316083 A1 Dec. 25, 2008

Related U.S. Application Data

(63) Continuation of application No. 11/173,278, filed on Jul. 1, 2005, now Pat. No. 7,427,941.

(51) Int. Cl.
*G08C 19/12* (2006.01)
(52) U.S. Cl. .................. 341/176; 345/158; 715/810; 725/52
(58) Field of Classification Search .......... 341/176; 348/569; 715/810, 831; 725/52; 345/158
See application file for complete search history.

(56) References Cited

U.S. PATENT DOCUMENTS

| 6,023,267 | A | 2/2000 | Chapuis et al. |
| 6,141,003 | A | 10/2000 | Chor et al. |
| 6,388,715 | B1 | 5/2002 | Eggen et al. |
| 6,757,906 | B1 | 6/2004 | Look et al. |
| 6,804,825 | B1 | 10/2004 | White et al. |
| 7,427,941 | B2 * | 9/2008 | Cleron et al. ............. 341/176 |
| 2002/0174433 | A1 | 11/2002 | Baumgartner et al. |
| 2003/0169299 | A1 | 9/2003 | Kusano et al. |
| 2004/0003407 | A1 | 1/2004 | Hanafee et al. |
| 2004/0045024 | A1 | 3/2004 | Marshall et al. |
| 2004/0078807 | A1 | 4/2004 | Fries et al. |

(Continued)

FOREIGN PATENT DOCUMENTS

EP 0030160 A2 6/1981

(Continued)

OTHER PUBLICATIONS

"LocationFreeTV, Television Unleashed," available at [[http:www.futureshop.ca/marketing/sony_locationfree/en/learnmore.asp?logon=&langid=EN&dept=0&text%5Fcookie=1&test%5Fcookie=1]], accessed on Nov. 8, 2005, 5 pages.

(Continued)

*Primary Examiner*—Timothy Edwards, Jr.
(74) *Attorney, Agent, or Firm*—Lee & Hayes, PLLC (57) ABSTRACT

Navigation logic and related methods are described for assisting a user in using a remote control (RC) device. The navigation logic determines a current state of a user's interaction with an application, and then determines the keys of the RC device that are relevant to the determined state. The navigation logic then displays a representation of the relevant keys on a user interface presentation of a presentation device. The representation resembles a physical layout of associated physical keys on the RC device. To assist the user in focusing on the relevant keys, the representation de-emphasizes other input mechanisms of the RC device that do not have a bearing on the user's current interaction with the application. One exemplary way of de-emphasizing these other keys is to entirely omit these keys from the representation.

18 Claims, 10 Drawing Sheets

U.S. PATENT DOCUMENTS

2005/0010952 A1     1/2005    Gleissner et al.
2006/0026655 A1     2/2006    Perez
2007/0283239 A1    12/2007    Morris

FOREIGN PATENT DOCUMENTS

WO         WO0195054 A2    12/2001

OTHER PUBLICATIONS

"Toshiba Offers Broad Range of DVD-Video Players," available at[[http://www.e-repair.co.uk/story35.htm]], accessed on Nov. 8, 2005, 4 pages.

\* cited by examiner

STATE-SENSITIVE NAVIGATION AID

REFERENCE TO RELATED APPLICATION

This application is a continuation of U.S. patent application Ser. No. 11/173,278, filed Jul. 1, 2005, which is incorporated by reference herein.

BACKGROUND

Advances in media processing and presentation equipment ("media equipment") have greatly expanded the versatility of such media equipment. For example, conventional television has evolved into functionality that can also potentially be used to display and interact with electronic program guide (EPG) data, browse and select video-on-demand (VOD) assets (e.g., movies), record and play back media programs, play games, interact with a wide area network (such as the Internet), shop and perform other commerce-related tasks, communicate with other users, and so forth.

However, expanding the versatility of media equipment also introduces new challenges. For instance, the increased versatility may equate to an increase in complexity of the media equipment. Such an increase in complexity may make it more difficult for the users to learn how to use the media equipment. From the standpoint of the user, this may cause frustration, as users typically engage in media equipment to fill their leisure time, not to develop quasi-computer-related skills. From the standpoint of the provider of the media equipment, the added complexity of the media equipment may result in users failing to fully engage the media equipment, which may equate to loss of revenue for the provider.

One aspect of media equipment that has become increasingly complex over the years is the remote control (RC) device. The RC device is used by a user to interact with applications that run on the media equipment. More specifically, the RC device is conventionally used to change channels, adjust the volume, control the recording and playback of media programs, navigate among miscellaneous user interface options, and so forth. However, as the media equipment has become more versatile by adopting additional features, RC devices have become more complex in lockstep. It is not uncommon for a user to rely on a very complex RC device having many dozens of input buttons. Furthermore, it is not uncommon for a user to rely on multiple RC devices, with different RC devices controlling different media processing devices. As a result of this complexity, even experienced users must sometimes spend a few moments hunting for an RC button which will invoke a desired function in the context of a particular media equipment application. This problem is, of course, exacerbated in the case of novice users, who may ultimately have to ask a more experienced user to point out the location of the sought-after button. It may also become difficult for any user to fully master the interface between the RC device and the media equipment, because different applications of the media equipment may redefine (e.g., remap) the functionality assigned to the buttons on the RC device, requiring the user to relearn the purpose served by the buttons in the context of new applications.

As appreciated by the present inventors, there is therefore an exemplary need in the art to provide functionality for assisting a user in using an RC device, and thereby assisting the user in interacting with an application provided by the media equipment.

SUMMARY

According to one exemplary implementation, navigation logic and related methods are described for assisting a user in using a remote control (RC) device. The navigation logic determines a current state of a user's interaction with an application, and then determines the keys of the actual RC device that are relevant to the determined state. The navigation logic then displays a representation of the relevant keys on a user interface presentation of a presentation device. The representation resembles a physical layout of associated physical keys on the RC device. To assist the user in focusing on the relevant keys, the representation de-emphasizes other input mechanisms of the RC device that do not have a bearing on the user's current interaction with the application. One exemplary way of de-emphasizing these other keys is to entirely omit these keys in the representation.

Through the use of the above-described provisions, the navigation logic guides the user in the use of the RC device. Namely, at any juncture in a user's interaction with an application, the navigation logic effectively highlights those keys which are relevant to a task at hand. These provisions have the effect of better integrating the user with the application being controlled via the RC device, that is, by more closely tying the user's actions with respect to the RC device with the application being controlled.

Numerous benefits ensue from the use of the navigation logic. For example, the navigation logic potentially reduces the user's confusion and frustration in interacting with an application. The navigation logic also potentially makes it more likely that the user will actively engage with the application, which may result in improved revenue for the entity which provides the application.

Additional implementations and features will be described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

To facilitate discussion, the navigation logic will be described in the exemplary context of functionality which presents media information to users. The term "media information," as used herein, refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television media programs, movies, etc.), and so on. The term "media program" represents any unit of media information that can be consumed by a client device. For example, a media program may represent a television media program, a movie, a piece of music, and so forth.

However, the navigation logic can be applied to other applications which do not involve the presentation of and interaction with media information. More generally stated, the navigation logic finds exemplary use in any environment in which a user interacts with any kind of application using any kind of input device. For example, the navigation logic can be used to assist a game player in using a control device by displaying an on-screen representation of the input mechanisms of the control device which are relevant to a current phase or level of the game being played. As another example, the navigation logic can be used to assist a computer user in using an input device (such as a mouse device or keyboard) by displaying a representation of the input mechanisms which are relevant to an application task at hand.

This disclosure includes the following sections. Section A describes an exemplary architecture for implementing the navigation logic described herein. Section B describes exemplary user interface presentations (or "pages") produced by the navigation logic, and related features. Section C describes exemplary procedures which explain the behavior of the navigation logic.

Exemplary Architecture for Implementing Navigation Logic

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents media program code (and/or declarative-type instructions) that performs specified tasks when executed on a processing device or devices (e.g., CPU or CPUs). The media program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software media program and/or hardware unit. The illustrated logic, modules and functionality can be located at a single site (e.g. as implemented by a processing device), or can be distributed over plural locations.

Exemplary System

Figure 1:
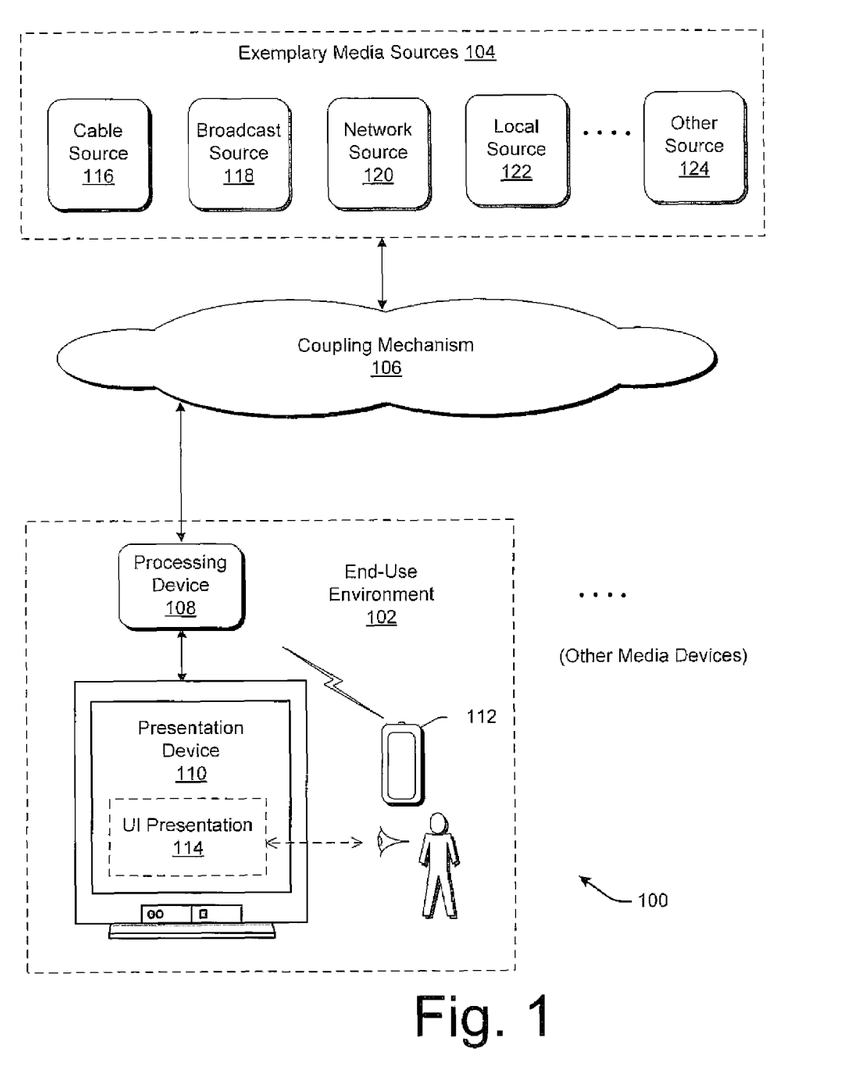
FIG. 1 shows an exemplary system for implementing navigation logic that guides a user in the use of a remote control (RC) device in the context of an application controlled by the RC device.

FIG. 1 shows an exemplary system 100 for implementing the navigation logic described herein. Broadly, the system 100 includes an end-use environment 102 that receives media information from one or more media sources 104 via a coupling mechanism 106. The end-use environment 102 may correspond to a home (or room in home) in which a user consumes media programs delivered by the media sources 104. Only one end-use environment 102 is shown to simplify the drawing; however, the reader will appreciate that the system 100 can include a great number of end-use environments, e.g., corresponding to different homes or different rooms within a single home. The explanation for the exemplary end-use environment 102 therefore applies to all other end-use environments (not shown).

Exemplary end-use environment 102 includes a processing device 108 coupled to a presentation device 110. The user interacts with the processing device 108 via a remote control (RC) device 112. The processing device 108 provides functionality for processing and presenting media information. In one case, the processing device 108 can correspond to a separate unit which couples to the presentation device 110 via one or more communication channels. For example, the processing device 108 may correspond to a set-top box which is coupled to the presentation device 110 via appropriate hardwired or wireless communication channels. Or the processing device 108 may represent a digital video disk player (DVD), a digital video recorder (DVR), a digital video disc rewritable (DVD-RW), etc., or any combination of these kinds of devices. In another case, the processing device 108 may correspond to functionality which is integrated into the presentation device 110 itself.

The presentation device 110 can correspond to any unit for presenting media information. In the most common case evoked in this explanation, the presentation device 110 corresponds to a television unit. But the presentation device 110 can also correspond to a unit which presents only audio information (e.g., a stereo system), a computer monitor display, and so forth.

The RC device 112 corresponds to any unit which allows the user to interact with the processing device 108. In the most common case evoked in this explanation, the RC device 112 corresponds to a handheld device that includes multiple keys that allow the user to control the selection and playback of media programs, as well as other tasks. Such a handheld device typically communicates with the processing device 108 via one or more wireless channels, such as via infrared signals. However, the RC device 112 can alternatively comprise a device which is coupled to the processing device 108 via a hardwired link, or a device which is actually integrated into the processing device 108 or the presentation device 110 (e.g., as an input panel of the processing device 108 or the presentation device 110, in which case the qualifier "remote" does not imply that the remote control device is spatially separated from the unit it controls, but merely is a distinct unit which interacts with the unit it controls).

By way of overview, the processing device 108 can present one or more applications, and the user can interact with the applications via the RC device 112. As used herein, the term "application" broadly represents any functionality that can be implemented by the processing device 108 which allows the user to perform one or more tasks. A media-related application can provide functionality which allows the user to perform tasks generally associated with the presentation of media programs, e.g., by interacting with EPG data, selecting VOD assets, controlling the playback of recorded programs, and so forth. A game-related application can provide functionality which allows the user to select and play a game. A commerce-related application can provide functionality which allows the user to browse through and select goods and/or services for purchase, and so on. In one case, the processing device 108 implements all of the logic necessary to provide an application. In another case, a remote entity (such as a head-end server entity) implements all of the logic necessary to provide an application, in which case the processing device 108 simply acts as a "conduit" which allows the user to receive and interact with the application. In still another case, both the processing device 108 and the remote entity can implement an application in distributed fashion, splitting the functionality between local and remote sites.

The system 100 includes navigation logic (not shown in FIG. 1) which presents a user interface presentation 114. The user interface presentation 114 presents graphical (and/or textual) information pertaining to the application. For example, the user interface presentation 114 can present electronic program guide (EPG) data. Or the user interface presentation 114 can present graphical information which allows the user to browse through and select assets (such as VOD movies, or merchandise in a commerce-related application). Or the user interface presentation 114 can present graphical information which allows the user to access information over a wide area network, such as the Internet. This is merely a small sample of many possible uses for the user interface presentation 114. In one implementation, the processing device 108 implements the navigation logic. In another case, a remote entity (such as a head-end entity) implements the navigation logic. In still another case, both the processing device 108 and the remote entity can implement the navigation logic in distributed fashion. To simplify the discussion, this explanation will assume that the first-mentioned scenario applies—namely, that the processing mechanism 108 locally implements the navigation logic.

As will be described in later sections, the navigation logic includes functionality which assists the user in interacting with an application via the RC device 112. It performs this task by: determining a current state of a user's interaction with the application; determining one or more keys (or other input mechanisms) of the RC device that are relevant to the determined state; and displaying a representation of the relevant keys on the user interface presentation 114 of a presentation device 110. The representation that is displayed resembles a physical layout of the relevant keys on the RC device itself. Further, the displayed representation de-emphasizes other input mechanisms of the RC device that do not have a bearing on the user's current interaction with the application. One exemplary way to de-emphasize these keys is to entirely omit these other keys from the representation. Another way is to display the relevant keys in a different manner than the de-emphasized keys.

To round out the discussion of FIG. 1, the media source 104 can include one or more kinds of sources. For instance, the media sources 104 can comprise a cable source 116 that transmits media programs via hardwired lines (e.g., coaxial cables) to the end-use environment 102. Alternatively, or in addition, the media sources 104 can comprise a broadcast source 118 that transmits media programs via conventional wireless transmission from a terrestrial antenna to the end-use environment 102 (or from a satellite source to the end-use environment 102). Alternatively, or in addition, the media sources 104 can comprise various network sources 120 that transmit media programs to the end-use environment 102. Alternatively, or in additional, the media sources 104 can comprise a local source 122 which provides media programs from within the end-use environment 102 for consumption by the end-use environment 102; for example, a local source 122 may correspond to a DVD player, a video jukebox, etc. disposed within the end-use environment 102 itself. Still further possible sources can be used to provide media content programs, as indicated by the generically labeled "other source" module 124 in FIG. 1.

In general, any of the media sources (116-124) can include any kind of infrastructure, such as various equipment for storing media content programs, various equipment for processing media content programs, various equipment for transmitting the media content programs, and so on. For example, a network source may include one or more server computers for processing and disseminating media programs to the end-use environment 102.

In one implementation, the media sources 104 can be configured to provide a one-way information conduit from the media sources 104 to the end-use environment 102. In another implementation, the media sources 104 can be configured to provide a two-way information conduit that also accommodates information transfer from the end-use environment 102 to the media sources 104: in this case, such transfer can be accomplished through the same coupling mechanism used to transfer information from the media sources 104 to the end-use environment 102, or via a supplemental coupling mechanism.

The coupling mechanism 106 can represent any kind of information conduit, or any combination of information conduits. In one case, this coupling mechanism 106 can represent a conventional cable coupling mechanism, local broadcast coupling mechanism, a satellite coupling mechanism, a digital network coupling mechanism, or other kind of coupling mechanism or combination thereof. In the case of a digital network coupling mechanism, the network can be implemented using the Internet, an intranet, a LAN network, and so forth, or some combination thereof. The coupling mechanism 106 can generally include any combination of hardwired links and wireless links, antennae, transmitters, routers, repeaters, gateways, etc. In the case where a local source 122 is used, the coupling mechanism 106 may represent a local network or point-to-point coupling arrangement implemented within a home.

Exemplary Processing Mechanism

Figure 2:
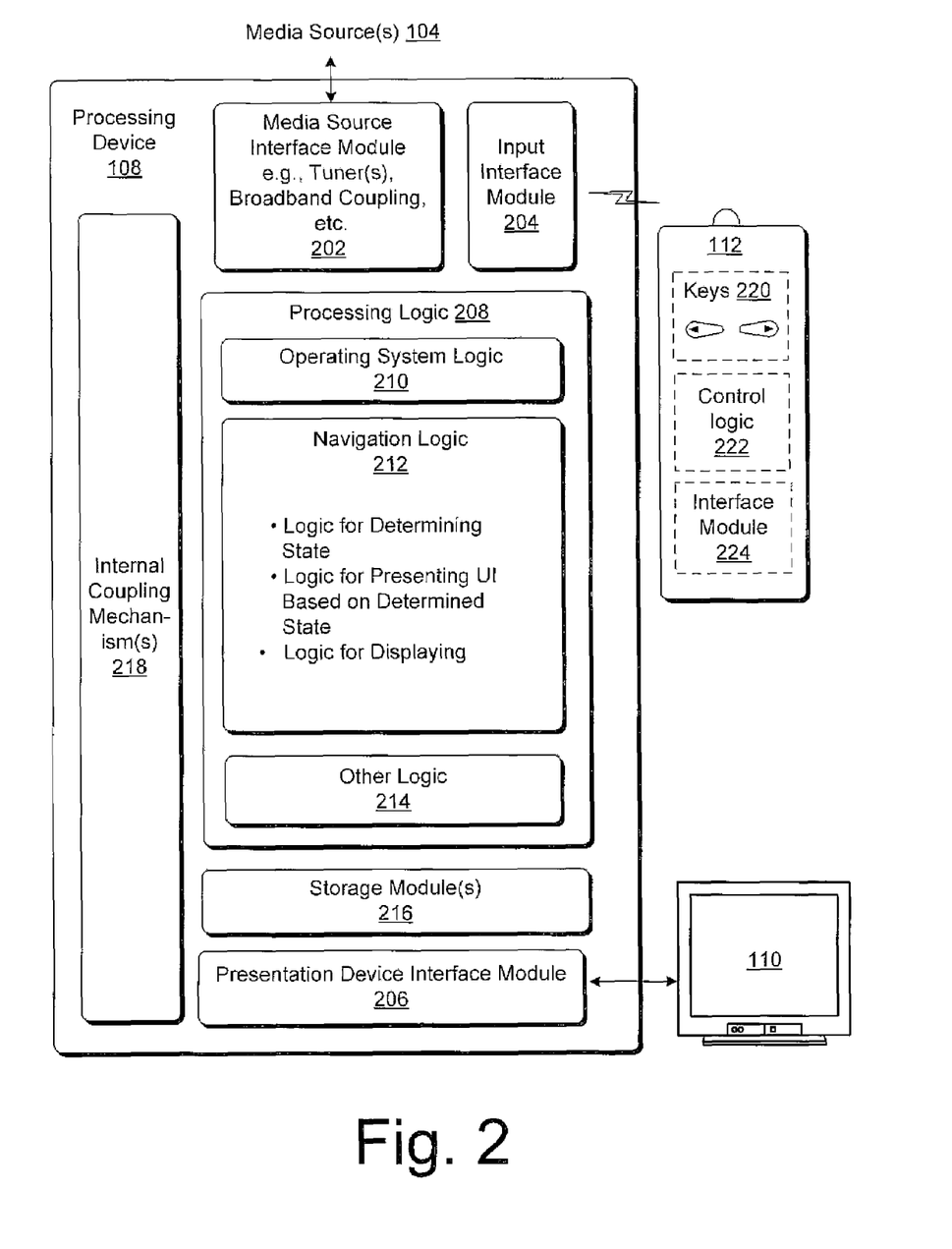
FIG. 2 shows an exemplary processing device used in the system of FIG. 1 for implementing the navigation logic.

FIG. 2 shows exemplary contents of the processing device 108. The processing device 108 includes a number of modules. Each of these modules can be implemented in software, hardware, or a combination of software and hardware. To achieve a software implementation, the processing device 108 can provide volatile and/or non-volatile memory (not shown) for storing machine readable code and one or more processors (e.g., CPUs) (not shown) for implementing this code. Alternatively, hardware implementations can rely, in whole or in part, on application-specific logic circuitry for implementing the prescribed functions to be described below.

To begin with, the processing device 108 includes a media source interface module 202 for receiving media programs from the media sources 104. The media interface module 202 broadly refers to any functionality (software and/or hardware) for receiving media content programs depending on the techniques used to transfer the media content programs. For conventional broadcast sources, the media source interface module 202 can include one or more physical tuners and reception components for tuning the processing device 108 to channels used by the media sources 104 to transmit media programs to the end-use environment 102, for demodulating the received media programs, and so forth. For network sources, the media source interface module 202 can include various kinds of virtual tuners for "tuning" to and receiving media programs from the network source 120 in unicast and/or multicast fashion, for decoding and processing the media programs, and so forth. In the case where two-way communication is permitted, the media source interface module 202 can also include functionality configured to transmit information to the media sources 104 (or to some other entity). The above-described examples are merely representative of a wide range of interface functionality that can be implemented by the media source interface module 202.

The processing device 108 can also include an input interface module 204 configured to interact with an input device, such as the RC device 112, a keyboard, a trackball, a joystick, a touch sensitive screen, and so on. In the illustrated implementation in which the processing device 108 interacts with the RC device 112, the input interface module 204 can include functionality configured to convert infrared signals received from the RC device 112 into digital signals that can be processed by the processing device 108. The input interface module 204 can also optionally include a mechanism for transmitting information from the processing device 108 to the RC device 112.

The processing device 108 also includes a presentation device interface module 206 for interfacing with the presentation device 110. For instance, the presentation device interface module 206 can include functionality for formatting video and audio signals for presentation at the presentation device 110 (which, in this case, is a conventional television unit). In audio applications, the presentation device interface module 206 can appropriately format audio signals for output to one or audio output devices (not shown).

The core of the processing functionality provided by the processing device 108 is implemented by the processing logic 208. The processing logic 208 can be implemented by hardwired logic circuitry, by one or more processing devices (CPUs) running machine readable code, or by a combination of hardware and software. To facilitate discussion, FIG. 2 depicts the processing logic 208 as including a plurality of logic modules, which may correspond to discrete logic circuitry units or sections of computer code that implement different functions. One of these modules is operating system logic 210. This module handles various background tasks associated with the operation of the processing device 108, such as the transfer of information between different components of the processing device 108.

Navigation logic 212 provides the functionality which allows the user to interact with one or more applications. Stated in another way, the navigation logic 212 allows the user to navigate within the applications, e.g., by browsing through options, selecting desired options, and so forth. Among the functions implemented by the navigation logic is the user interface guidance-related function which is the focus of this disclosure. To implement this function, the navigation logic 202 includes: logic configured to determine a current state of the user's interaction with an application; logic configured to determine one or more RC device keys (or other input mechanisms) that are relevant to the determined state; and logic configured to display a representation of the one or more relevant keys on the user interface presentation 114 of the presentation device 110.

As mentioned above, the representation resembles a physical layout of the relevant keys on the RC device 112 itself. Further, the representation de-emphasizes other input mechanisms of the RC device 112 that do not have a bearing on the user's current interaction with the application. More specifically, in a particular state, one or more keys may not be relevant because they do not, or can not, perform any useful function. For example, if an application state corresponds to a scenario in which the user is at the start of a list that can be browsed through, a left arrow button on the RC device 112 does not serve any function, because the user cannot advance to the left of the first in the list. Similarly, if the user is simply advancing through channels, then the OK or Enter button common included in RC devices does not serve any function, as there is nothing about the simple presentation of a channel that can be invoked by pressing the OK or Enter button. Accordingly, in the situations, the navigation logic 212 can de-emphasize these buttons. The next section provides examples of user interface presentations 114 which illustrate the behavior of the navigation logic 212.

The navigation logic 212 can implement the above functions in various ways. One exemplary way that the navigation logic 212 can implemented these function is by providing a series of rules. The rules can be expressed in if-then type format to map possible states that an application may enter to the consequent emphasis and de-emphasis of appropriate keys. Namely, one rule might read: IF the user is working in mode X and is at the start of a list, THEN de-emphasize the left arrow key. Another exemplary way that the navigation logic 212 can implement these functions is by storing a lookup table for each application. The table can identify a plurality of different states that a user may enter into when interacting with an application. The table can also identify the relevant keys associated with those states.

In use, the navigation logic 212 can first determine a state associated with the user's current interaction with an application. The navigation logic 212 can assess the current state in different ways, such as by making note of the particular component of a collection of user interface pages with which the user is currently interacting, or by making note of a particular program code module that the user is currently invoking. The navigation logic 212 can apply a particular rule set or lookup table to map the assessed current state into those RC keys which are considered relevant to the current state. In a more complex implementation, the navigation logic 212 can analyze a series of the user's recent input actions to better determine the operation that the user is currently attempting to perform. Still other implementations of the navigation logic 212 are possible, including artificial intelligence tools which surmise the current state of the user's interaction with an application (and the keys relevant to this interaction) using expert system technology.

The navigation logic 212 can present the representation of the relevant keys in different ways. In one technique, the navigation logic 212 can present the representation in the form of a picture-in-picture (PIP). The PIP overlays other visual material presented on the presentation device 110 (such as the presentation of the media program being consumed). In the case in which the representation of the relevant keys is animated, the navigation logic 212 can present a substream of data for presentation of the presentation device 110 in PIP form.

As noted above, the illustration of the navigation logic 212 as being entirely implemented by the processing device 108 is merely illustrative. In another case, the navigation logic 212 can be implemented entirely by a remote entity (such as a remote head-end server). In still another case, the navigation logic 212 can be implemented by a distributed combination of the processing device 108 and a remote entity.

The processing logic 208 can also handle a variety of other functions not directly relevant to the navigation behavior featured in this description. FIG. 2 generically labels such other functionality as "other logic" 214.

The processing device 108 can also include one or more storage modules 216. These storage modules 216 can include various types of volatile and non-volatile memory. Exemplary storage modules can be dedicated to storing program code and/or user data. The storage modules 216 can also provide various floppy disk drives, hard disk drives, optical disk drives, etc. for storing any kind of information.

Finally, the processing device 108 can include one or more internal coupling mechanisms 218 for coupling its various modules together. These coupling mechanisms 218 can represent various buses, various point-to-point coupling connections, and so on.

FIG. 2 also shows a simplified depiction of the RC device 112 used to interact with the processing device 108. The RC device 112 can include a collection of keys 220 that allow the user to enter information. The RC device 112 also includes control logic 222 for implementing the RC device 112's functionality. That is, the general task assigned to this control logic 222 is to translate the user key actuations into signals that can be transmitted to the input interface module 204 of the processing device 108 via wireless (e.g., infrared) transmission or some other channel. This control logic 222 can comprise hardwired circuitry or a processing device that implements machine readable code, or some combination of hardware and software. The RC device 112 also includes an interface module 224 for actually performing the wireless transmission of signals to the processing device 108. The interface module 224 can optionally receive signals transmitted from the processing device 108.

Remote Control

Figure 3:
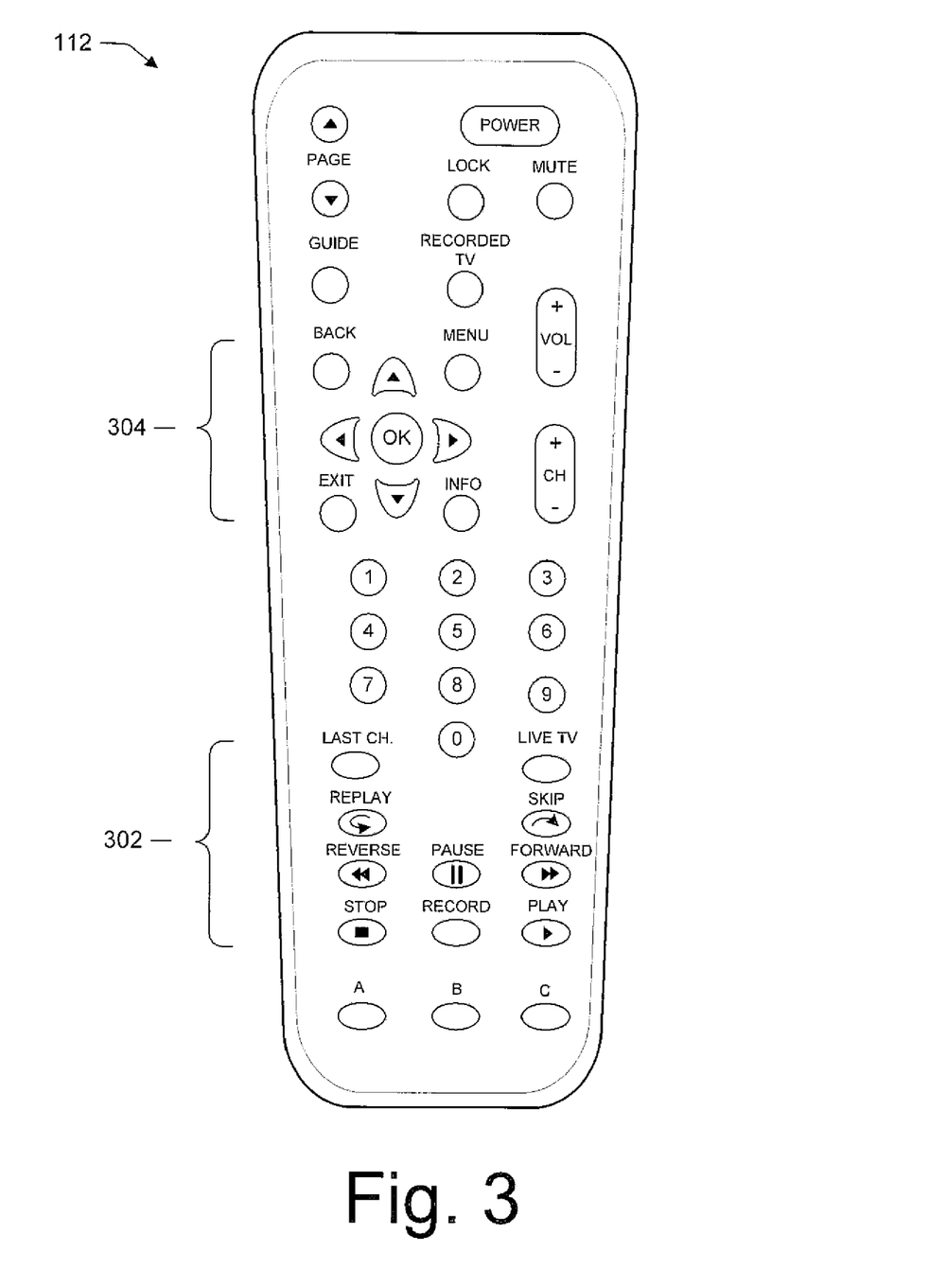
FIG. 3 shows an exemplary one of many possible kinds of RC devices that can be used to interact with the system of FIG. 1.

FIG. 3 provides a more detailed illustration of the exemplary RC device 112 shown in FIG. 2. The selection, shape, style, labeling, and placement of the keys shown in FIG. 3 is merely illustrative of one of many possible RC device designs.

One series of keys 302 (stop, rewind, play, forward, previous, pause, next, etc.) are used to control the presentation of a program in a conventional manner (providing that the presentation of the program can be controlled in this manner). These keys are referred to as "program control keys" herein. Another series of keys 304 provide a mechanism for navigating through the user interface presentations (114) of any application. Namely, this series of keys 304 includes left, right, up, and down keys that allow a user to navigate in specific respective "directions" within the user interface presentations 114. An OK key disposed in the center of these navigation keys allows a user to select or activate a particular item that is currently highlighted (or more generally, currently has focus) in the user interface presentation 114. This series of keys 304 is referred to herein as the "application navigation keys." The other keys shown in FIG. 3 are not pertinent to the examples set forth in this disclosure.

Again, the keys shown in FIG. 3 are entirely exemplary. For example, additional keys can be added. Alternatively, a subset of the keys shown in FIG. 3 can be omitted. Alternatively, the positional arrangement and style of the keys shown in FIG. 3 can be varied in any way.

As will be set forth in the next section, the navigation logic 212 displays a graphical representation of the keys shown in the RC device 112. In the case most often evoked in this disclosure, the navigation logic 212 provides an on-screen representation of the application navigation keys 304 (i.e., the directional arrow keys and the OK key). In another possible case, the navigation logic 212 can also provide an on-screen duplication of relevant members of the play control keys 302. More generally, the navigation logic 212 can be used to provide an on-screen display of any combination of keys shown in FIG. 3 (including all of the keys), or any combination of the keys of any other kind of RC device.

As will be discussed, the navigation logic 212 also provides various supplemental ways of emphasizing the keys of the RC device 112 that are particularly pertinent to the user's current interaction with an application, such as by adding animation or audio content to the displayed relevant keys.

Exemplary User Interface Presentations and Related Features

This section, with reference to FIGS. 4-9, sets forth several examples of user interface presentations 114 (and other features) that can be used to guide the user in the use of the RC device 112. The navigation logic 212 generates these user interface presentations 114 in the manner described above.

Figure 4:
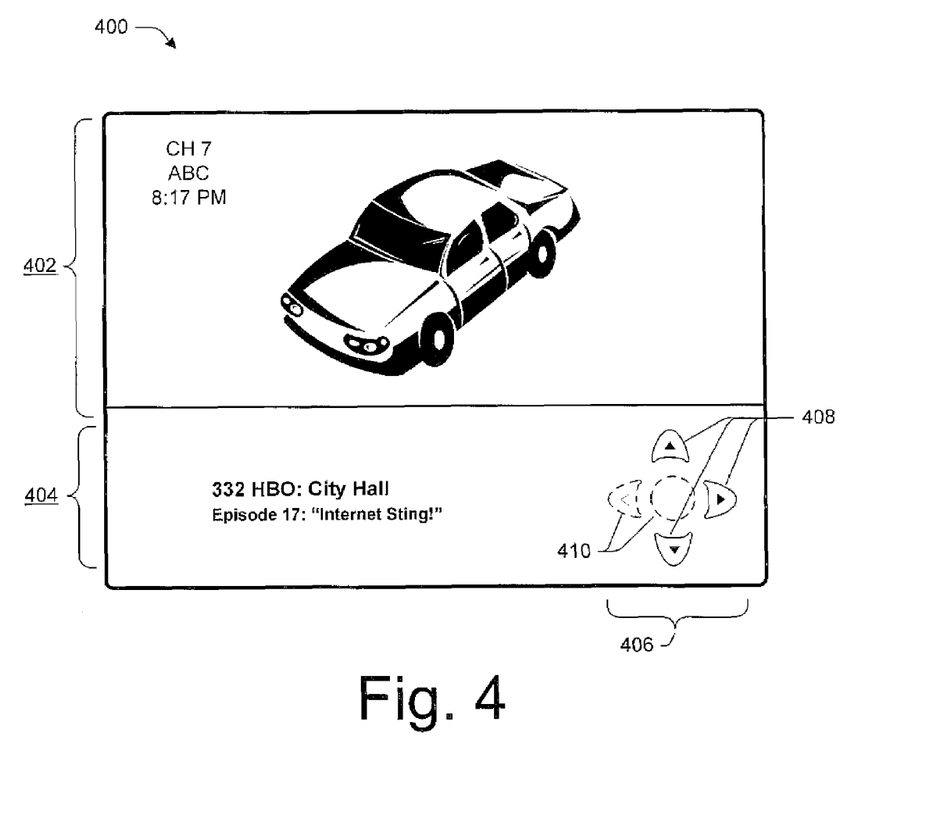
FIGS. 4-8 show different exemplary user interface presentations that can be presented by the navigation logic.

Beginning with FIG. 4, this figure shows a user interface presentation 400 that includes two sections. A first section 402 presents a media program for consumption by the user, which, in this case, corresponds to a television program ("City Hall") that airs on a specified channel. A second section 404 presents a bar that can provide textual and/or graphical information relevant to an application with which the user may interact.

The second section 404 includes a graphical representation 406 of the application navigation keys 304 of the RC device 112 shown in FIG. 3. The representation 406 preferably shows the application navigation keys 304 in a manner which corresponds to the physical layout of the application navigation keys 304 on the RC device 112 itself. Moreover, the representation 406 highlights members of the application navigation keys 304 which are directly pertinent to the current state of the user's interaction with the application. In this particular case, the up arrow, down arrow, and right arrow (collectively identified in FIG. 4 as the "relevant keys" 408) of the application navigation keys 304 have been deemed relevant, while the left arrow and the OK button (collectively identified in FIG. 4 as the "non-relevant keys" 410) are not deemed to be pertinent. Thus, the navigation logic 212 has highlighted (or emphasized) the relevant keys 408, but not the non-relevant keys 410. This situation may correspond to the exemplary case in which the user is at the start of a list of programs, so the left arrow key serves no purpose, and is consequently de-emphasized. Further, in this state, the OK key may not serve a purpose (because there is nothing to select or activate), and is therefore also de-emphasized.

The navigation logic 212 can use different techniques to emphasize and de-emphasize keys in the representation 406. One technique is to entirely eliminate the display of the non-relevant keys 410 so that the user does not even see these keys. Another technique is to display the relevant keys 408 in a different manner than the non-relevant keys 410. For example, the non-relevant keys 410 can be displayed as less bright or more transparent than the relevant keys 408. Or the non-relevant keys 410 can be displayed in a different color than the relevant keys 408. Still other graphical techniques are possible to assist the user in distinguishing between the relevant keys 408 and the non-relevant keys 410.

Figure 5:
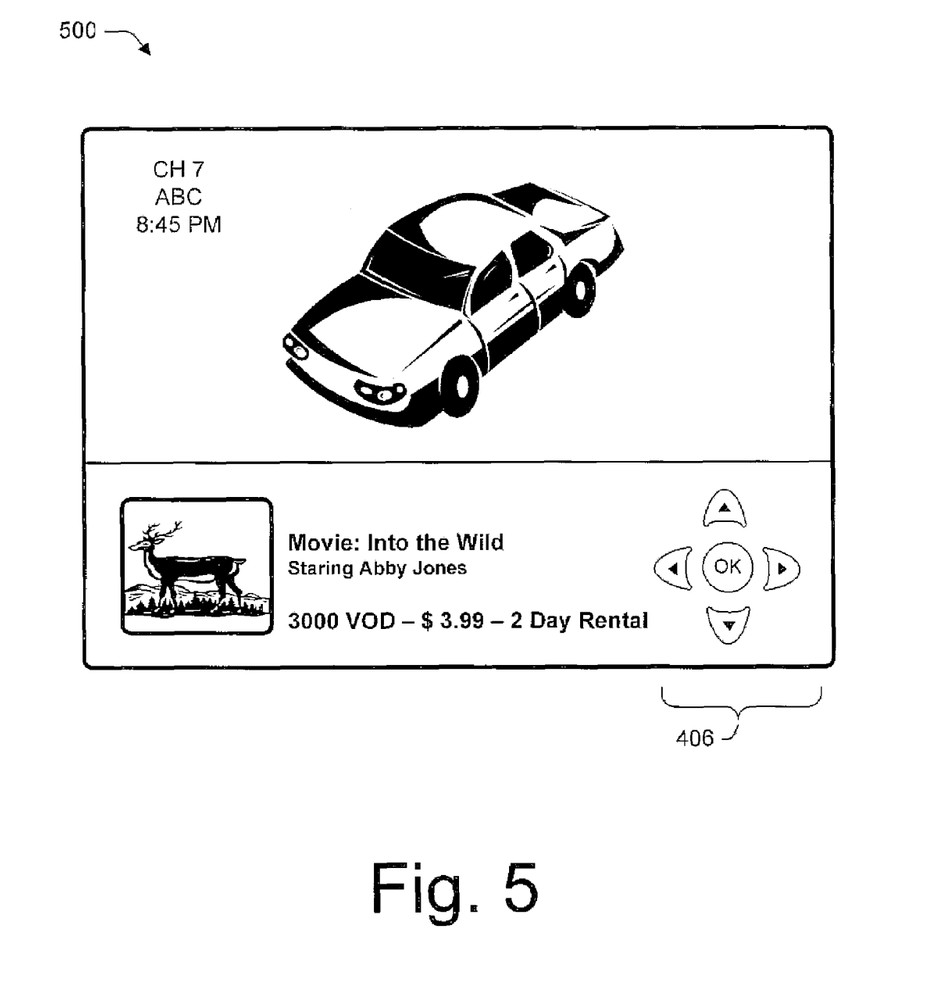
Figure 6:
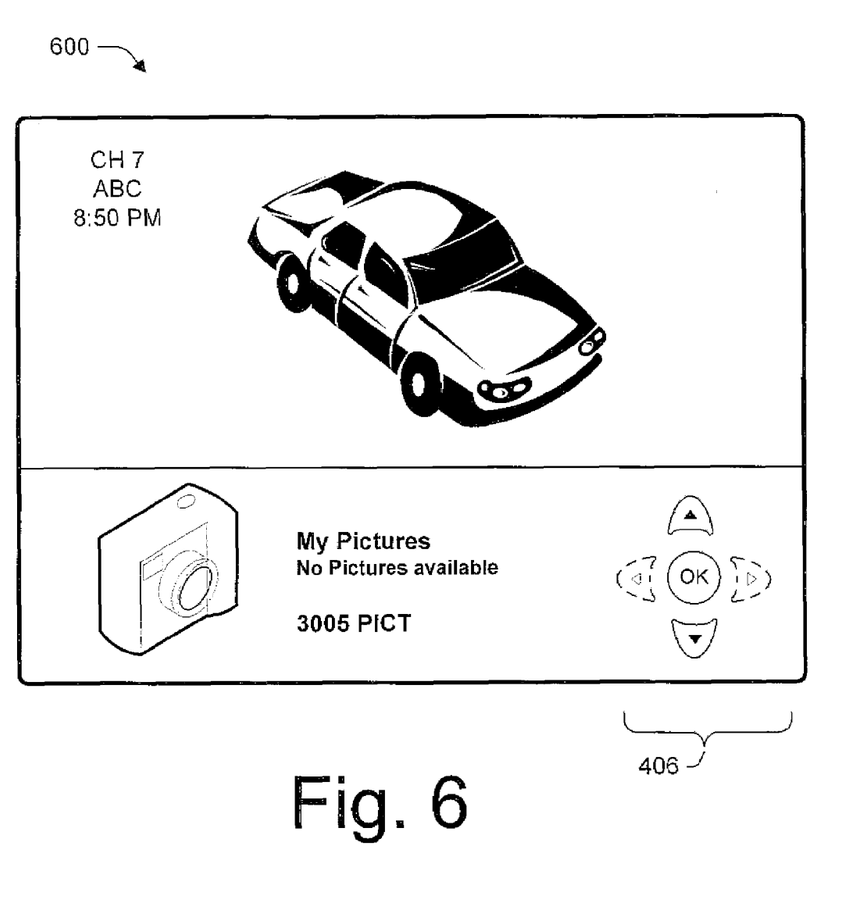

FIGS. 5 and 6 present two other user interface presentations (500, 600, respectively). In these figures, the state of the user's current interaction with the application has changed because the user has invoked different application functions. For example, in the case of FIG. 5, the user is currently browsing through a collection of VOD assets. In FIG. 6, the user is currently attempting to browse through a collection of pictures. Different keys are deemed relevant and non-relevant to these respective current states. For example, in the case of FIG. 5, the navigation logic 212 determines that all of the navigation keys 304 are relevant to the user's current interaction with the application. Hence, the navigation logic 212 visually indicates that all of the keys are relevant in the representation 406 by de-emphasizing none of the keys. In FIG. 6, the navigation logic 212 determines that just the up arrow key, down arrow key and the OK key are relevant to the user's current interaction with the application. Hence, the navigation logic 212 visually indicates just these keys are relevant (by omitting or other otherwise de-emphasizing the left arrow key and the right arrow key in the representation 406, which are collectively deemed non-relevant keys).

Through the above-described provisions, the user can be quickly and effectively informed of the collection of keys on the RC device 112 which can be activated to interact with the application. That is, the representation 406 guides the user's input activity so that it is more closely integrated with flow of the application itself, reducing the amount of "hunting" that the user must perform to find appropriate keys when interacting with the application in a particular application state.

Figure 7:
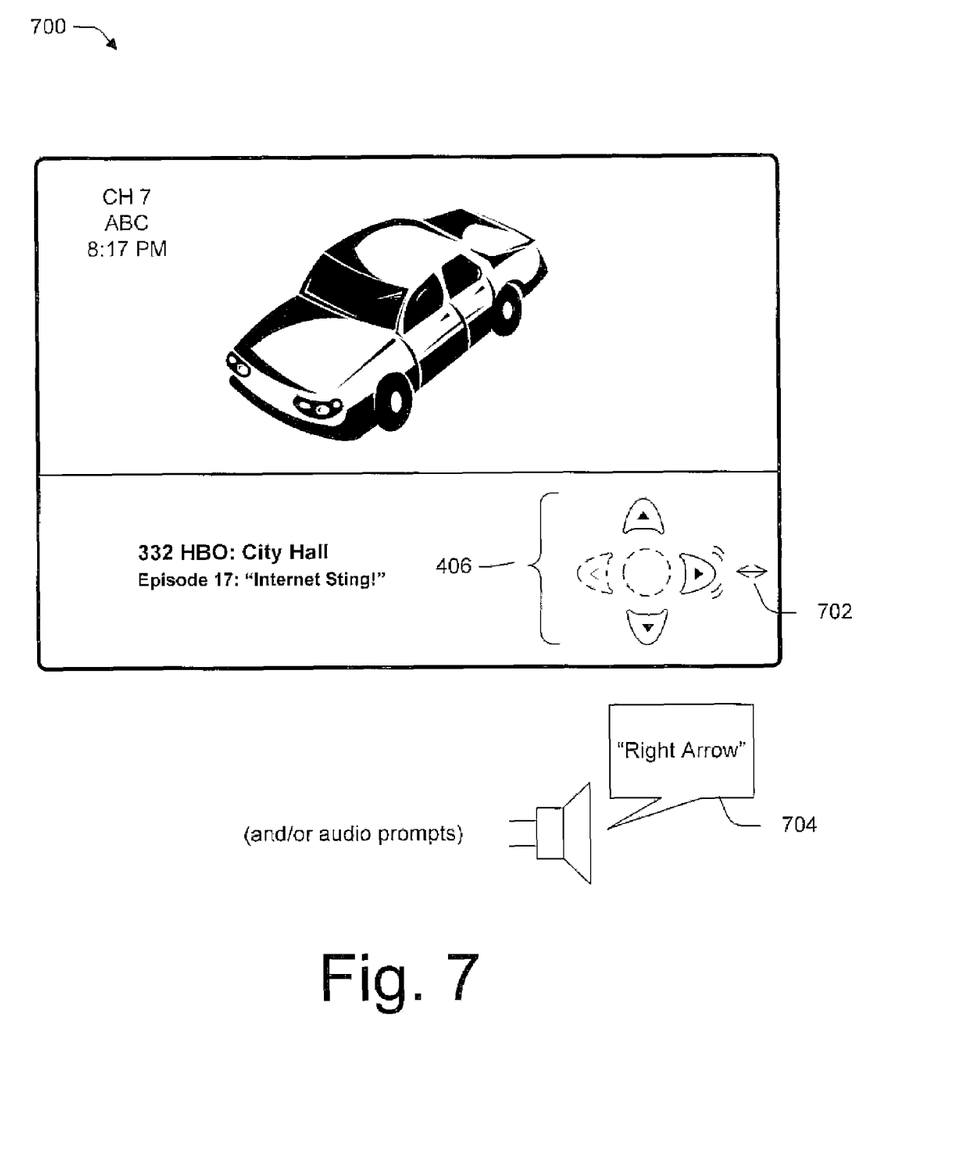

FIG. 7 shows various ways in which the navigation logic 212 can supplement the representation 406 to better alert the user to the identity and location of relevant keys. According to one feature, the navigation logic 212 animates one or more relevant keys. Animation can comprise the presentation of a series of still images that simulates movement, an animated graphical presentation, a video substream, and so forth.

For example, in the user interface presentation 700, arrow 702 indicates that the navigation logic 212 animates the right arrow key (which is one of the relevant keys at this current state), e.g., by making the right arrow key move a slight jog to the right, and then back to its original position. In one case, the navigation logic 702 can produce this movement when the user presses the right arrow key on the RC device 112. This helps confirm to the user that they have indeed pressed a key which the navigation logic 212 has assessed as being relevant. This at least lets the user know that they are operating on the correct collection of keys on the RC device 112. In another case, the navigation logic 212 can produce movement of the keys to invite the user to activate particular keys (that is, prior to the user having activating these particular keys).

In another implementation, instead of animating the relevant keys themselves, the navigation logic 212 can provide other animated cues which point out the relevant keys, such as animated arrows or characters which point to the relevant keys. In another implementation, the navigation logic 212 can also presentation animation when the user activates a non-relevant key, such as by presenting a flashing "X" signal to indicate that the key that the user has pressed does not serve a useful function in the current application state. Still other permutations of this design concept are possible.

Alternatively, or in addition, the navigation logic 212 can produce audible cues which assist the user in identifying relevant keys on the RC device 112. Audio prompt 704 shown in FIG. 4 represents this concept. The audio prompts can be implemented by the navigation logic 212 as a stored collection of messages, which can be correlated to different application states using any kind of indexing strategy. As in the case with animation, in one case, the audio prompts can alert the user to the fact that they have already pressed a certain key that is deemed relevant. Or the audio prompts can encourage the user to activate a certain key before the user presses this key. Still other permutations of this design concept are possible.

The representation 406 shown in FIGS. 4-7 only presents a small subset of the keys of the RC device 112, namely just the application navigation keys 304. In other scenarios, the navigation logic 212 can presents a different subset of keys, such as the media playback keys 302, and any other combination of keys.

Figure 8:
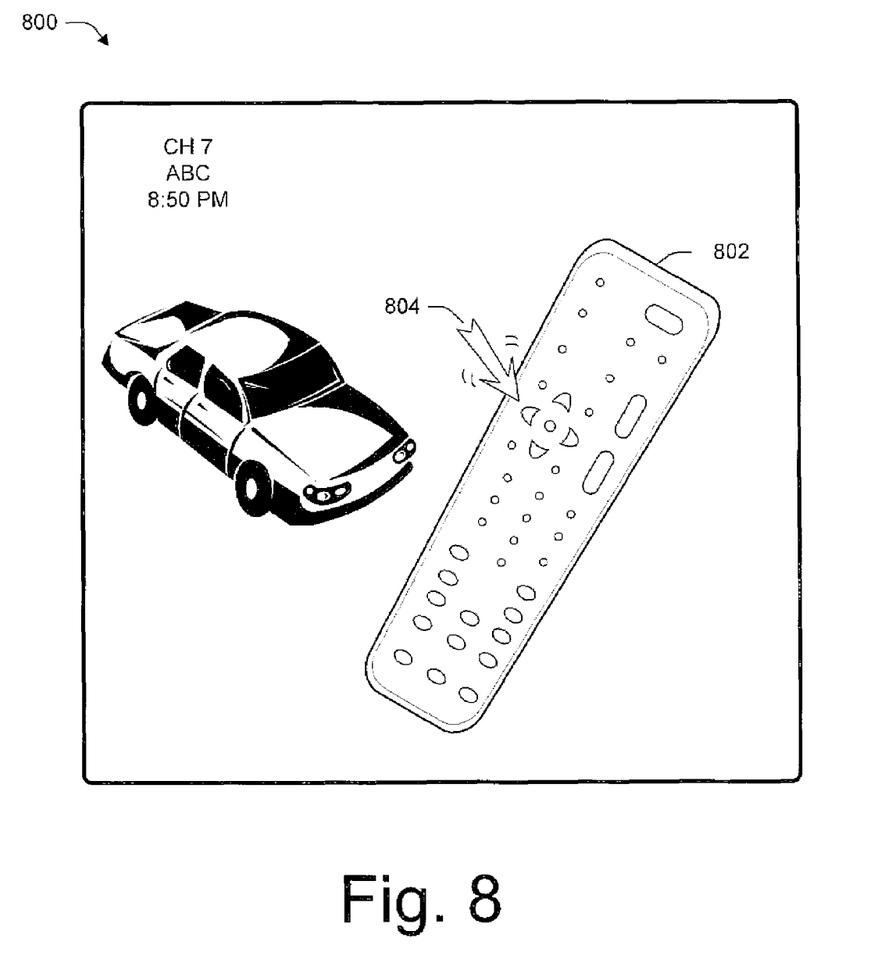

Alternatively, the user interface presentation 800 shown in FIG. 8 illustrates the case where the navigation logic 212 presents a representation 802 of the entire RC device 112. The navigation logic 212 can then highlight the keys that are relevant to the user's current interaction with an application, by removing non-relevant keys, or by displaying the non-relevant keys in a different manner than the relevant keys. This implementation may better inform the user of the location of relevant keys, as it shows the relevant keys in the context of the entire RC device 112. The navigation logic can optionally include supplemental cues, such as the animated arrow 804 or audio information (not shown), which further serve to point out the location of relevant keys.

Figure 9:
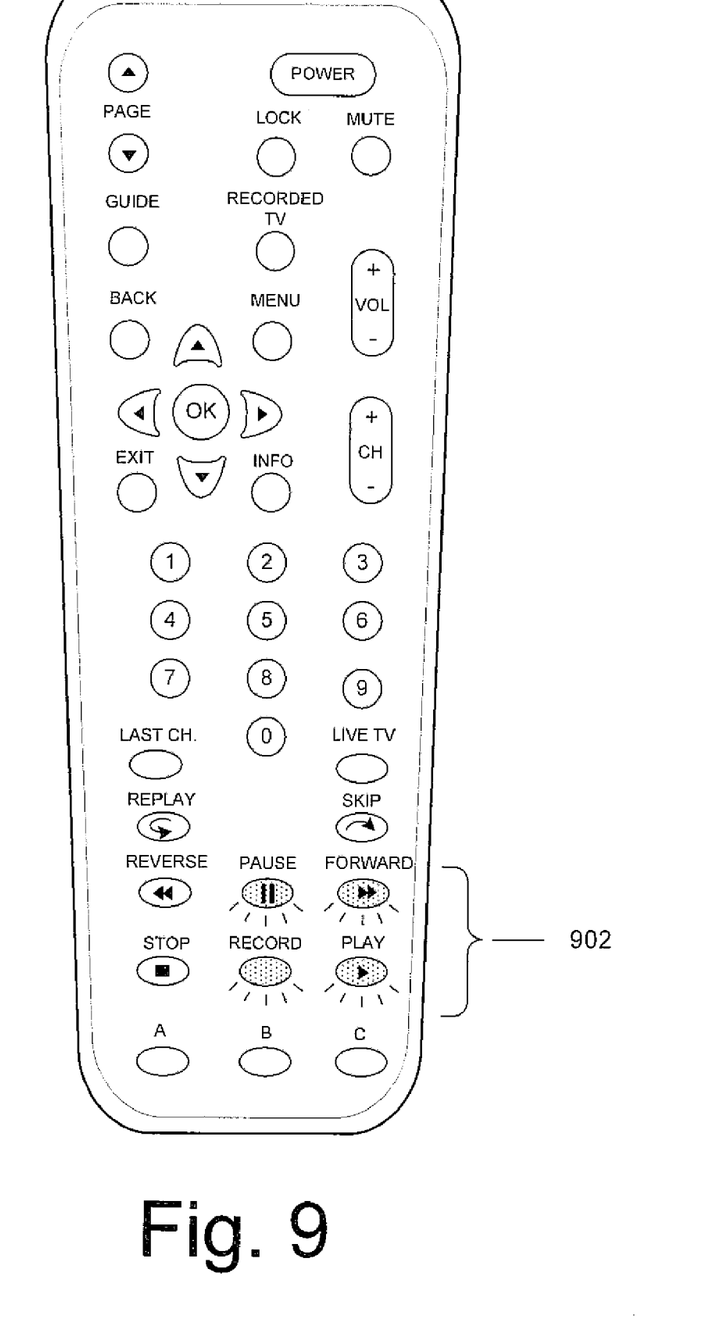
FIG. 9 shows an exemplary alternative or supplemental technique for guiding a user in the use of the RC device, involving the presentation of prompting cues at the RC device itself.

Lastly, FIG. 9 shows a case in which the navigation logic 212 actually sends information back to the RC device 112 regarding the relevant keys. The control logic 222 of the RC device 112 can then apply this information by generating visual and/or audio prompts on the RC device 112 itself. FIG. 9 particularly shows the exemplary case in which the control logic 22 causes relevant keys 902 to light up or glow on the RC device 112. This unambiguously identities the keys which are relevant to a user's current interaction with an application. In this case, the playback keys 302 have been deemed pertinent to the user's current state in interacting with the application. Other techniques can be used to provide cues, such as by dynamically recessing non-relevant keys beneath the face plate of the RC device 112, displaying telltale beeps or other audio prompts that lets the user know whether they have pressed a relevant key or a non-relevant key, and so forth.

Exemplary Method of Operation

Figure 10:
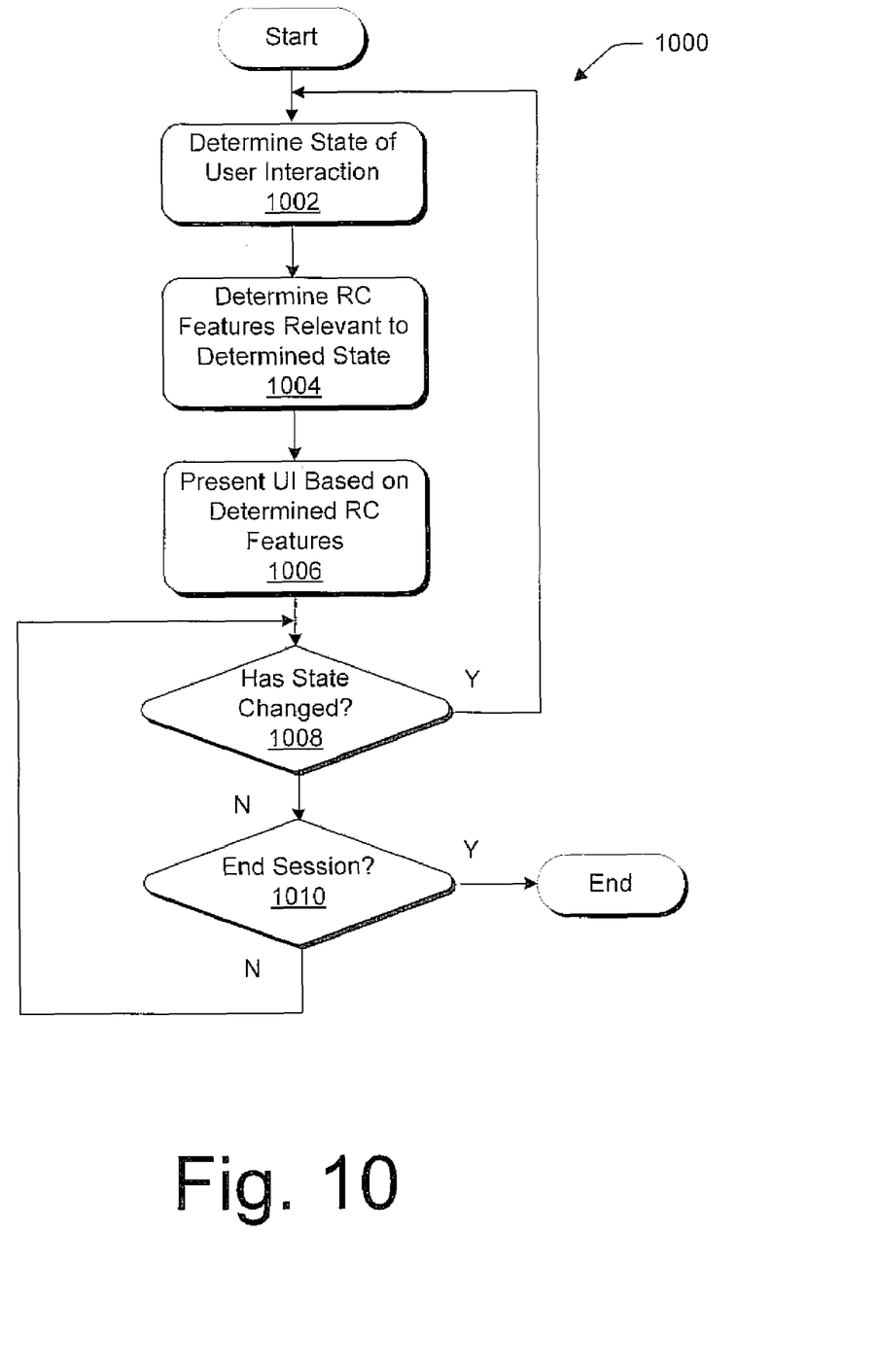
FIG. 10 shows an exemplary procedure for guiding a user in the use of the RC device in the context of an application controlled by the RC device.

FIG. 10 describes the operation of the navigation logic 212 in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the example set forth in this disclosure. As many functions described in this flowchart have already been explained in prior sections, this section will serve primarily as a review of those functions.

In step 1002 of procedure 1000, the navigation logic 212 determines a current state of a user's interaction with an application. In step 1004, the navigation logic 212 determines the RC device keys (or more generally, the input mechanisms) which are deemed relevant to the current state. As described above, one way of performing this operation is to consult a rule set or lookup table, which maps current state into relevant keys. In step 1006, the navigation logic 212 presents the user interface presentation 114 which emphasizes the keys which have been determined to be relevant vis-à-vis the keys that have been determined to be non-relevant. In step 1008, the navigation logic 212 determines whether the state has changed, and if so, prompts the repetition of the above-described steps so as to potentially highlight a different combination of relevant keys. In step 1010, the navigation logic 212 determines whether the user has ceased interacting with the application, and if so, the procedure 1000 comes to an end.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for guiding a user in the use of a remote control (RC) device, wherein the RC device includes a plurality of input mechanisms, comprising:

determining a current state of a user's interaction with an application, to provide a determined state;

determining one or more input mechanisms of the RC device that are relevant to the determined state, to provide one or more relevant input mechanisms capable of performing operational functions specific to the determined state; and displaying a representation of the one or more relevant input mechanisms on a user interface presentation of a presentation device, wherein the user interface presentation is split into at least two sections, and the displaying comprises:

displaying a media program or a display of digital pictures for user consumption on a first section of the user interface presentation, displaying options or text associated with the media program or the display of digital pictures on a second section of the user interface presentation, and displaying the one or more relevant input mechanisms on the first section and the second section of the user interface presentation, wherein the representation de-emphasizes irrelevant input mechanisms of the RC device, distinguishing irrelevant input mechanisms from relevant input mechanisms, wherein irrelevant input mechanisms are not capable of performing an operational function specific to the determined state.

2. The method of claim 1, wherein the application pertains to the presentation of media programs to the user, and wherein the RC device is configured to navigate among options or lists associated with the presentation of the media programs.

3. The method of claim 1, wherein the displaying comprises showing a subset of the RC device's input mechanisms on the user interface presentation.

4. The method of claim 1, wherein the displaying comprises showing all of the RC device's input mechanisms on the user interface presentation.

5. The method of claim 1, wherein the de-emphasizing of the irrelevant input mechanisms comprises omitting the presentation of the irrelevant input mechanisms.

6. The method of claim 1, wherein the de-emphasizing of the irrelevant input mechanisms comprises presenting the irrelevant input mechanisms in a different manner than the one or more relevant input mechanisms.

7. The method of claim 1, wherein the one or more relevant input mechanisms comprises one or more application navigation keys or one or more keys for controlling the playback of a recorded media program on the RC device.

8. One or more computer readable storage media including machine readable instructions for implementing the method of claim 1.

9. A computer readable memory device storing navigation logic configured to guide a user in the use of a remote control (RC) device, wherein the RC device includes a plurality of input mechanisms, the navigation logic comprising:

logic configured to determine a current state of a user's interaction with an application, to provide a determined state;

logic configured to determine at least one input mechanism that is relevant to the determined state, to provide at least one relevant input mechanism capable of performing an operational function specific to the determined state; and logic configured to display a representation of the at least one relevant input mechanism on a user interface presentation of a presentation device wherein the displaying comprises presenting a media program and a display of digital pictures for user consumption on a first part of the user interface presentation, and the at least one relevant input mechanism on a second part of the user interface presentation in the form of a picture-in-picture (PIP), the at least one relevant input mechanism capable of performing an operational function with respect to the PIP, and wherein the representation de-emphasizes irrelevant input mechanisms of the RC device, distinguishing irrelevant input mechanisms from relevant input mechanisms, wherein irrelevant input mechanisms are not capable of performing an operational function specific to the determined state.

10. The computer readable memory device of claim 9, wherein the PIP overlays the media program or display of digital pictures for user consumption.

11. The computer readable memory device of claim 9, wherein the navigation logic is configured to present a substream of data for presenting a media program or a display of digital pictures for user consumption on a first part of the user interface presentation, and the at least one relevant input mechanism on a second part of the user interface presentation in the form of PIP.

12. An apparatus comprising a computer readable storage device storing navigation logic, the navigation logic comprising:

logic configured to present media programs to a user, on a presentation device, via a network;

logic configured to communicate with a processing device useable to present the media programs on the presentation device, the logic further configured to send media programs to a media source interface module of the processing device, using Internet Protocol over the network;

logic configured to receive instructions from a remote control (RC) device, wherein the RC device includes a plurality of input mechanisms;

logic configured to determine a current state of a user's interaction with the apparatus, to provide a determined state;

logic configured to determine at least one input mechanism that is relevant to the determined state, to provide at least one relevant input mechanism capable of performing an operational function specific to the determined state; and logic configured to display a representation of the at least one relevant input mechanism on a user interface presentation of the presentation device, wherein the displaying comprises displaying a media program or a display of digital pictures for user consumption on a first part of the user interface presentation, and the at least one relevant input mechanism on a second part of the user interface presentation, wherein the representation resembles a physical layout of the at least one relevant input mechanism on the RC device, and wherein the representation de-emphasizes irrelevant input mechanisms of the RC device, thereby distinguishing irrelevant input mechanisms from relevant input mechanisms, wherein irrelevant input mechanisms are not capable of performing an operational function specific to the determined state.

13. The apparatus of claim 12, wherein the logic configured to communicate with the processing device is further configured to send media programs to the media source interface module of the processing device, using Internet Protocol over the network in unicast or multicast fashion.

14. The apparatus of claim 12, wherein the apparatus comprises a remote head-end server.

15. The apparatus of claim 12, wherein the network comprises one or more of: the Internet, an intranet, a wireless communication network, a local area network (LAN), a wide area network (WAN), or a point-to-point network.

16. The apparatus of claim 12, further comprising logic configured to send instructions to the RC device.

17. The apparatus of claim 12, wherein the logic for displaying is configured to de-emphasize the irrelevant input mechanisms of the RC device by omitting the presentation of the irrelevant input mechanisms or by presenting the irrelevant input mechanisms in a different manner than the at least one relevant input mechanism.

18. One or more computer readable storage media including machine readable instructions for implementing the navigation logic of claim 12.

* * * * *